United States Patent [19]

Hook, Jr.

[11] Patent Number: 4,730,979
[45] Date of Patent: Mar. 15, 1988

[54] SENSOR GUIDE TUBE ASSEMBLY FOR TURBINE WITH CLEARANCE RESTORATION ADJUSTMENT

[75] Inventor: Richard B. Hook, Jr., Burnt Hills, N.Y.

[73] Assignee: General Electric Company, Schenectady, N.Y.

[21] Appl. No.: 811,976

[22] Filed: Dec. 23, 1985

[51] Int. Cl.⁴ .................... G01K 7/02; F01D 25/00
[52] U.S. Cl. .................... 415/118; 415/137; 60/39.32; 374/144
[58] Field of Search ............... 415/118, 200, 126-128, 415/134-139; 60/39.32, 705; 374/144

[56] References Cited

U.S. PATENT DOCUMENTS

| | | | |
|---|---|---|---|
| 3,788,143 | 1/1974 | Gabriel | 374/144 |
| 4,132,114 | 1/1979 | Shah et al. | 374/144 |
| 4,406,580 | 9/1983 | Baran, Jr. | 415/118 |
| 4,459,043 | 7/1984 | Luke | 374/144 X |
| 4,566,268 | 1/1986 | Hoffeins et al. | 60/39.32 X |

Primary Examiner—Robert E. Garrett
Assistant Examiner—Joseph M. Pitko
Attorney, Agent, or Firm—Jerome C. Squillaro

[57] ABSTRACT

A sensor guide tube for bridging a plenum between a turbine housing and a nozzle assembly includes an offset portion whose offset is substantially equal to half the distance which the nozzle assembly is displaced upstream for clearance restoration. After clearance restoration, the guide tube is rotated 180 degrees to align its lower end with an opening in the nozzle assembly without requiring a sharp bend in the axis of the sensor guide tube.

3 Claims, 6 Drawing Figures

SENSOR GUIDE TUBE ASSEMBLY FOR TURBINE WITH CLEARANCE RESTORATION ADJUSTMENT

BACKGROUND OF THE INVENTION

The present invention relates to turbines and, more particularly, to apparatus for guiding a sensor into the interior of a turbine when interior stationary and rotating elements therein are displaced for clearance restoration.

Gas and steam turbines extract energy from a high-temperature, high-pressure working fluid by impinging it on the blades or buckets of a plurality of rotatable turbine wheels. A set of stationary nozzles is positioned between each adjacent pair of turbine wheels. The nozzles are made up of a plurality of aerodynamic vanes which turn and accelerate the working fluid in order to impinge it on the buckets or blades of its following stage at the correct velocity and exit angle.

The outer extremities of the aerodynamic vanes are supported against the force of the working fluid by cantilevered attachment to an outer band, affixed to a turbine casing. The inner extremities of the aerodynamic vanes are affixed to an inner band. A diaphragm is affixed to the inner band radially inward thereof. The entire burden of supporting the vanes, diaphragm and inner band falls on the outer band since no stationary element may ride on the turbine shaft.

In a gas turbine, the outer band, vanes, inner band and diaphragm are called a nozzle assembly. In a steam turbine, the nozzle assembly is called the diaphragm.

In order to simplify the following description, the terminology of gas turbines will be used.

The high gas temperatures experienced by the vanes and diaphragms of the nozzle assembly are sufficient, when combined with high gas pressures, to force their material to deform in a downstream direction. In time, the material may creep sufficiently to alter clearances between rotating elements and contiguous elements of the nozzle assembly. If the creep is permitted to remain uncorrected, destructive rubbing may take place between stationary and rotating parts.

When clearances between stationary and rotating parts decrease a predetermined amount, it is conventional to remove the turbine wheel and nozzle assemblies, and to machine critical surfaces for restoring the clearances.

The machining operation generally entails shipment of the removed parts to a precision machine shop and a substantial delay in returning the turbine to service. Such precision machining is expensive. In addition, while the turbine is out of service, the work normally done by the turbine must either be foregone or be performed by alternate means which may entail the purchase of power and/or lease of substitute equipment. These solutions impose costs which are preferably avoided or reduced.

One alternative is to make at least some of the elements of the nozzle assembly of high-strength alloys capable of withstanding creep at the temperatures and forces involved. Such high-strength materials add significantly to the cost and are not repairable.

Another alternative employs additional air cooling of the affected parts. The cooling air added to the working fluid passing through the turbine undesirably degrades the efficiency of the turbine.

A further alternative, as disclosed in co-pending patent application Ser. No. 811,987), filed on the same date as the present application, provides means for displacing the nozzle assembly in the upstream direction sufficiently to restore clearances. When this is done, the connection point of a sensor guide tube, bridging the space between the turbine housing and interior elements of the turbine, is correspondingly shifted in the upstream direction. If means are not provided to correct it, such shifting of the connection point could result in an unacceptable bend in the passage for the sensor cable or a misalignment of the guide tube to the turbine housing port which would prevent assembly of the sensor into the guide tube.

OBJECTS AND SUMMARY OF THE INVENTION

Accordingly, it is an object of the invention to provide apparatus for maintaining alignment of a sensor guide tube in a turbine.

It is a further object of the invention to provide apparatus for maintaining alignment of a sensor guide tube of a turbine while permitting upstream displacement of a nozzle assembly thereof for restoring clearances between stationary and rotating elements of the turbine.

It is a still further object of the invention to provide a guide tube assembly in which an offset portion of the guide tube is displaceable a distance substantially equal to the displacement of the nozzle assembly required for clearance restoration. The displacement of the offset portion is achieved by rotating the guide tube about 180 degrees in a sealable fitting.

Briefly stated, the present invention provides a sensor guide tube for bridging a plenum between a turbine housing and a nozzle assembly. The sensor guide tube includes an offset portion whose offset is substantially equal to half the distance which the nozzle assembly is displaced upstream for clearance restoration. After clearance restoration, the guide tube is rotated 180 degrees to align its lower end with an opening in the nozzle assembly without requiring a sharp bend in the axis of the sensor guide tube.

According to an embodiment of the invention, there is provided a guide tube assembly for a turbine, the turbine including a housing and an inner member, the inner member being displaceable in a predetermined direction a predetermined distance D with respect to the housing, comprising: the guide tube extending between the housing and the inner member, a guide tube access hole through the housing, a sealable fitting in the guide tube access hole, an upper portion of the guide tube passing sealably through the sealable fitting, a lower portion of the guide tube, an end of the lower portion fitting into an opening in the inner member, first and second bends in the guide tube effective to displace the lower portion from the upper portion by a distance substantially equal to half of the distance D while maintaining the upper and lower portions substantially parallel to each other, and the fitting being of a type permitting the guide tube to be rotated at least 180 degrees therein, whereby the lower portion is moveable the distance D in the predetermined direction.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
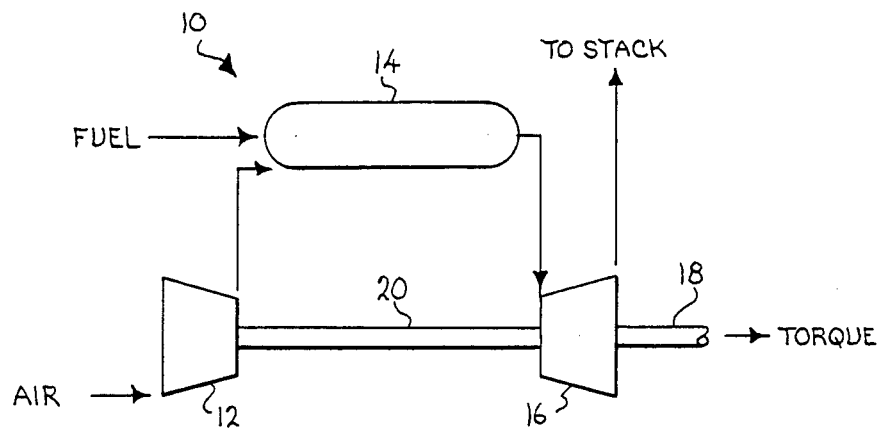
FIG. 1 is a simplified schematic diagram of a gas turbine to which reference will be made in describing the environment of the present invention.

Referring to FIG. 1, there is shown, generally at 10, a gas turbine which provides the environment for the present invention. A compressor 12 provides a supply of compressed air to a combustor 14 for burning a supply of fuel to produce a supply of hot, energetic gas. The hot gas from combustor 14 is applied to a succession of rotatable turbine wheels (not shown) in a turbine 16. The turbine wheels rotate an output shaft 18 for delivering torque to a load (not shown). A compressor shaft 20, concentric with, and connected to, turbine 16, drives compressor 12. The present invention is located in turbine 16.

Figure 2:
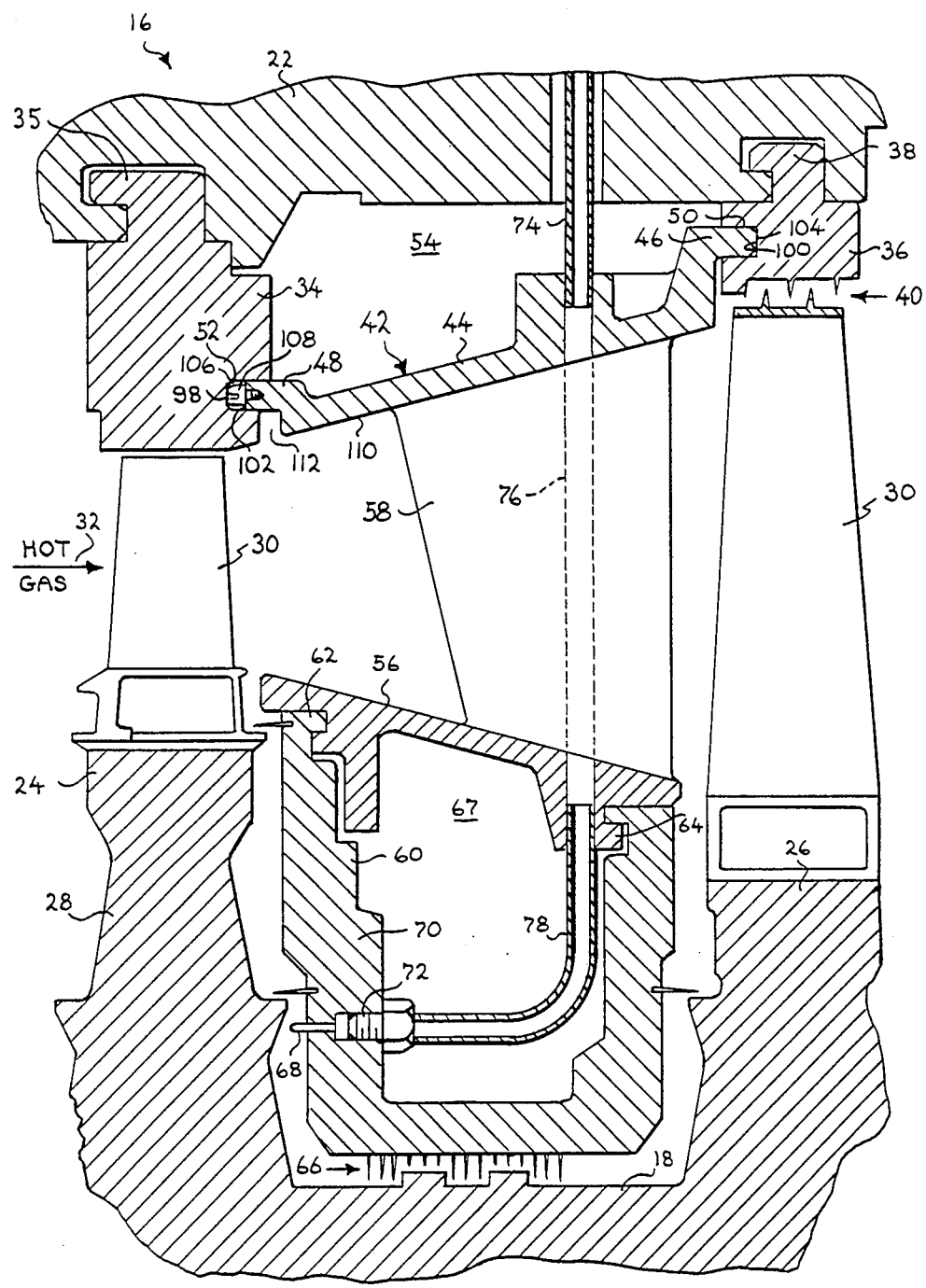
FIG. 2 is a cross section of a portion of a turbine according to an embodiment of the invention.

Referring now to FIG. 2, turbine 16 includes an annular housing 22 enclosing all stages thereof. Conventionally, turbine 16 includes a plurality of turbine stages of which only two turbine stages 24 and 26 are shown. Each of turbine stages 24 and 26 includes a shroud 28 affixed for concerted rotation with output shaft 18 and a plurality of turbine blades 30. Turbine blades 30 are aerodynamically shaped and angled to the direction of gas flow indicated by a flow arrow 32. Shroud 34 closely surrounds the tips of turbine blades 30 on turbine stage 24. Shroud 34 is affixed to housing 22 by interlocking joints 35. Similarly, a shroud 36 closely surrounds the tips of turbine blades 30 on turbine stage 26. Shroud 36 is affixed to housing 22 by an interlocking joint 38. A labyrinth seal 40 may also be provided for sealing the tips of turbine blades 30.

A stationary nozzle assembly 42 is interposed between turbine stages 24 and 26 for turning and accelerating hot gas leaving turbine blades 30 of turbine stage 24 before impinging it on turbine blades 30 of turbine stage 26. Nozzle assembly 42 includes a plurality of arcuate segments which together form an outer band 44 having a leading hook 46 and a trailing hook 48 fitted into slots 50 and 52 in shrouds 36 and 34, respectively. The inner walls of housing 22, shrouds 36 and 34, and outer band 44 collectively define an enclosed plenum 54 which may be used, for example, as a conduit for cooling air.

An inner band 56 defines the radially inner extremity of the gas path. A plurality of vanes 58 bridge the space between outer band 44 and inner band 56. Vanes 58 are aerodynamically shaped and angled with respect to the axis of turbine 16 for turning and accelerating the gas exiting turbine stage 24 before impinging it on turbine blades 30 of turbine stage 26.

A diaphragm 60 is affixed to inner band 56 by keyed joints 62 and 64. A labyrinth seal 66, to be further discussed hereinafter, seals against excessive gas leakage past nozzle assembly 42. Inner surfaces of inner band 56 and diaphragm 60 define a plenum 67.

Turbine 16 employs a plurality of sensors for monitoring operational parameters such as, for example, temperatures and pressures therein. A temperature sensor 68 extends through an upstream wall 70 of diaphragm 60 toward shroud 28. In the preferred embodiment, temperature sensor 68 is of a type connected by a laterally flexible and tangentially stiff cable (not shown) which permits temperature sensor 68 to be installed and removed by feeding it down a sensor guide tube. When temperature sensor 68 reaches a position close to its operational position, it is pushed into a portion 72 in upstream wall 70. The sensor guide tube consists of an upper sensor guide tube 74 bridging plenum 54 between housing 22 and outer band 44, an intermediate sensor guide tube 76 passing through outer band 44, vane 58 and inner band 56, and a lower sensor guide tube 78 passing from inner band 56 to upstream wall 70.

The hot gas applies a substantial force in the downstream direction on nozzle assembly 42. Although the force varies according to the type of machine and the turbine stage, a downstream force of as much as 100,000 pounds may be encountered. This force is transmitted to the structure of turbine 16 entirely through outer band 44. Gas temperatures on the order of, for example, from about 1400 to about 2000 degrees F, combined with the large downstream force, may produce a time-dependent downstream creep or distortion of nozzle assembly 42 wherein the radially inner part of nozzle assembly 42 may take a permanent position displaced a fraction of an inch downstream. Such displacement has significance in the clearances between rotating and stationary parts.

Turbine 16 includes a number of regions where critical clearances exist. For purposes of description, however, it is deemed sufficient to describe the effect of creep on the clearances in the vicinity of labyrinth seal 66. One skilled in the art will be fully enabled to relate the change in clearance in labyrinth seal 66 to those in other areas of turbine 16.

Figure 3:
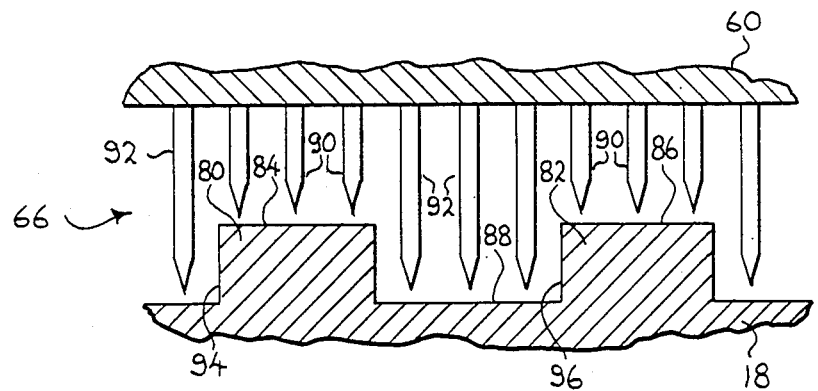
FIG. 3 is an enlarged cross section of a labyrinth seal of FIG. 2 before creep of elements of a nozzle assembly has occurred.

Referring now to FIG. 3, labyrinth seal 66 is shown before the effect of creep. Two lands 80 and 82 having flat upper surfaces 84 and 86, respectively, with a flat-bottomed groove 88 therebetween, are machined into the surface of output shaft 18. A plurality of short teeth 90 are affixed to diaphragm 60 and extend close to, but do not touch, flat upper surfaces 84 and 86. A plurality of long teeth 92 are affixed to diaphragm 60 and extend close to, but do not touch, flat-bottomed groove 88. Additional lands and grooves, with their respective short and long teeth may be provided, but will not be described.

As the gas attempts to traverse the pressure differential between the ends of labyrinth seal 66, a controlled flow of gas passes through the narrow spaces separating the ends of the teeth from their facing surfaces. Each ring imposes a pressure drop on the gas flowing therethrough, whereby the pressure drop across any one of the teeth is held to a moderate value. Such a moderate pressure drop is capable of driving only a small gas flow therepast. Thus, labyrinth seal 66 is effective for sealing against a large pressure differential without requiring contact between rotating and stationary elements.

Figure 4:
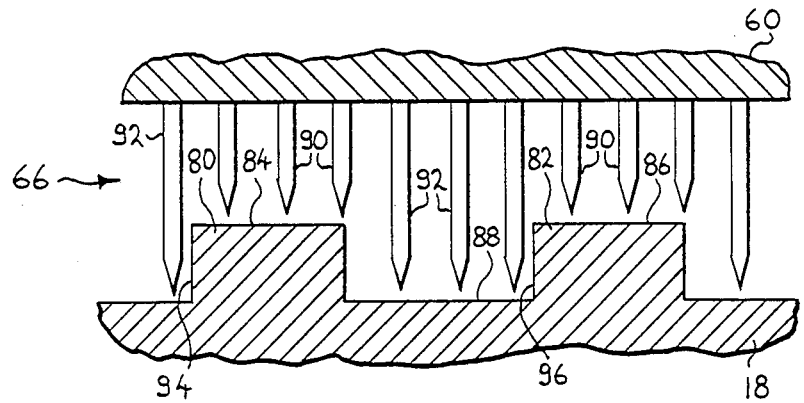
FIG. 4 is a view corresponding to FIG. 3 after creep has occurred showing the effect of such creep on clearances.

Referring now to FIG. 4, labyrinth seal 66 is shown after a substantial creep has occurred. It will be noted that the downstream ones of long teeth 92 are displaced close to rubbing contact with a side surface 94 of land 80 and a side surface 96 of land 82. If permitted to continue, further creep could produce destructive rubbing contact. In addition, downstream ones of short teeth 90 are moved far enough downstream that they no longer provide effective seals with flat upper surfaces 84 and 86.

In the prior art, the clearances shown in FIG. 4 are restored to the condition in FIG. 3 by removing the apparatus from service and rebuilding and/or remachining the elements of labyrinth seal 66 (as well as other critical clearances not discussed).

Returning now to FIG. 2, provision is made in turbine 16 for restoring clearances without machining the parts. The axial distance between an inner end 98 of slot 52 and an inner end 100 of slot 50 exceeds the axial distance between an outer end 102 of trailing hook 48 and an outer end 104 of leading hook 46, respectively. Thus, before clearance restoration, a substantial space 106 exists between inner end 98 and outer end 102. When turbine 16 is in service, the downstream force imposed by the hot gas is fully adequate to maintain outer band 44 in the downstream position shown. For shipment and startup, however, a plurality of spacer buttons 108 (only one of which is shown) affixed to outer end 102 limit the upstream displacement of nozzle assembly 42. An upstream end of a radially inner surface 110 of outer band 44, which defines the radially outer perimeter of the gas path, stops short of contact with interlocking joint 34, whereby an adjustment gap 112 is provided.

Figure 5:
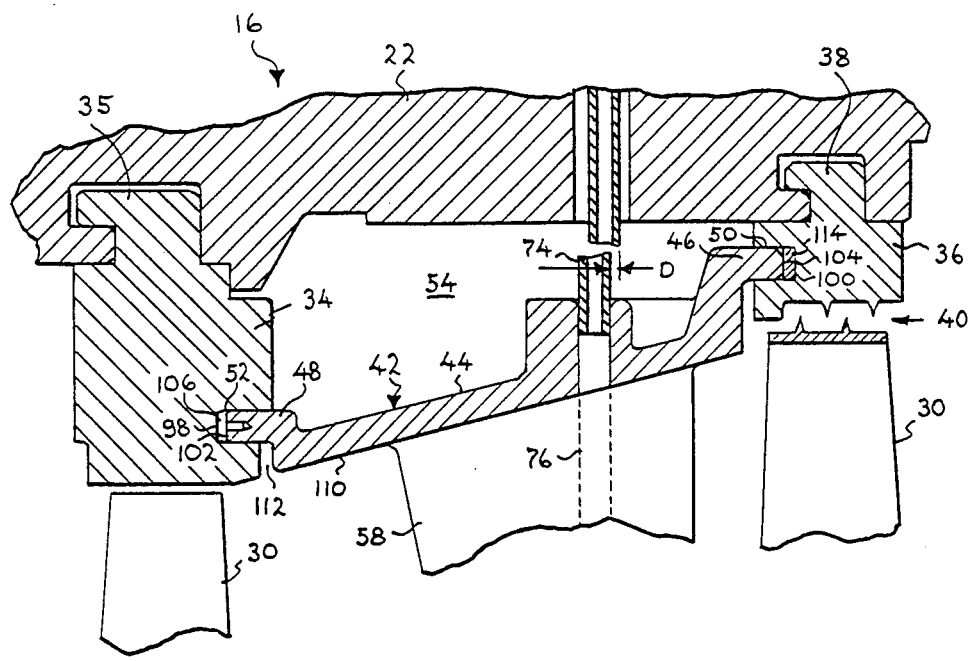
FIG. 5 is a cross section of a portion of the apparatus of FIG. 2 showing relevant parts of the nozzle assembly after displacement has been performed for clearance restoration.

Referring now to FIG. 5, turbine 16 is shown in its position following clearance restoration. Nozzle assembly 42 is displaced upstream by moving trailing hook 48 deeper into slot 52, thus closing up at least parts of space 106 and adjustment gap 112. Spacer buttons 108 (FIG. 2) may be removed if necessary. A shim or spacer 114 is inserted between inner end 100 and outer end 104 to retain nozzle assembly 42 in the selected position against gas forces.

Figure 6:
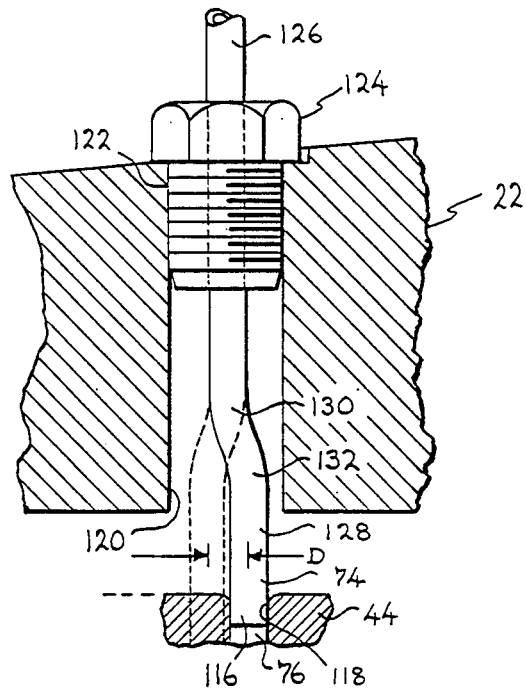
FIG. 6 is a cross section of a portion of the casing of the turbine of FIGS. 2 and 5 showing the guide tube adaptation for clearance restoration.

Upstream displacement of nozzle assembly 42 misaligns upper sensor guide tube 74 with its former point of connection to nozzle assembly 42 by a distance D. Smooth curves of long radius are desirable for guiding a sensor to its destination. Thus, the amount of misalignment is preferably compensated in the manner shown in FIG. 6, to which reference is now made.

The position of upper sensor guide tube 74 before clearance restoration is shown in solid line and its position after clearance restoration is shown in dashed line. The distance D is exaggerated for convenience of illustration. Distance D is typically on the order of 0.2 inch. Before clearance restoration, a lower end 116 of upper sensor guide tube 74 fits into an opening 118 in outer band 44. After clearance restoration, lower sensor guide tube 78 is moved distance D upstream (to the left in the figure).

A sensor guide tube access hole 120 passing through housing 22 includes a threaded portion 122 at its outer end. A suitable fitting 124 such as, for example, a compression fitting, is threaded into threaded portion 122. An upper portion 126 of upper sensor guide tube 74 passes sealingly through fitting 124. A lower portion 128 is offset a distance D/2 from upper portion 126 by first and second gentle bends 130 and 132 while maintaining the axis of lower portion 128 generally parallel to the axis of upper portion 126. Thus, rotation of upper portion 126 about an angle of 180 degrees, displaces lower end 116 upstream the required distance D, with lower portion 128 remaining parallel to opening 118, whereby the only curves which the sensor must negotiate are the gentle curves of bend 130 and 132. As a consequence, the upstream displacement of outer band 44 is accommodated without requiring an unacceptable sharp angular transition from upper sensor guide tube 74 to intermediate sensor guide tube 76.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A guide tube assembly for a turbine, said turbine including a housing and an inner member, said inner member being displaceable in a predetermined direction a predetermined distance D with respect to said housing, comprising:

a guide tube extending between said housing and said inner member;

a guide tube access hole through said housing;

a sealable fitting in said guide tube access hole;

an upper portion of said guide tube passing sealably through said sealable fitting;

a lower portion of said guide tube;

an end of said lower portion fitting into an opening in said inner member;

first and second bends in said guide tube effective to displace said lower portion from said upper portion by a distance substantially equal to half of said distance D while maintaining said upper and lower portions substantially parallel to each other; and said sealable fitting being of a type permitting said guide tube to be rotated at least 180 degrees therein, whereby said lower portion is moveable said distance D in said predetermined direction.

2. A guide tube assembly according to claim 1 wherein said sealable fitting is a compression fitting.

3. A guide tube assembly according to claim 1 wherein said inner member includes a nozzle assembly and said guide tube is a sensor guidetube.

* * * * *